United States Patent
Oyane et al.

(10) Patent No.: US 8,224,386 B2
(45) Date of Patent: Jul. 17, 2012

(54) RADIO BASE STATION EQUIPMENT, RADIO COMMUNICATION SYSTEM AND DELAY CORRECTION METHOD

(75) Inventors: Hidehiko Oyane, Kanagawa (JP); Daisuke Tanigawa, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/001,090

(22) PCT Filed: Jun. 2, 2009

(86) PCT No.: PCT/JP2009/060011
§ 371 (c)(1),
(2), (4) Date: Feb. 23, 2011

(87) PCT Pub. No.: WO2010/001676
PCT Pub. Date: Jan. 7, 2010

(65) Prior Publication Data
US 2011/0135300 A1  Jun. 9, 2011

(30) Foreign Application Priority Data
Jul. 3, 2008  (JP) .................... 2008-174918

(51) Int. Cl.
*H04B 1/38* (2006.01)
(52) U.S. Cl. ............. 455/561; 398/25; 370/342
(58) Field of Classification Search ........... 455/424, 455/561, 456.1; 375/147, 316; 370/350, 370/335, 342, 432, 500; 398/25
See application file for complete search history.

(56) References Cited

U.S. PATENT DOCUMENTS 6,141,337 A * 10/2000 Uta et al. .................. 370/350
6,889,051 B2 * 5/2005 Ogino et al. ............. 455/456.1

FOREIGN PATENT DOCUMENTS

| JP | 2005269034 A | 5/2005 |
| JP | 2005252996 A | 9/2005 |
| JP | 200613778 A | 1/2006 |
| JP | 2006352258 A | 12/2006 |
| JP | 2009538028 | 10/2009 |
| WO | 2007133045 A1 | 11/2007 |

OTHER PUBLICATIONS

Japanese Office Action for JP Patent Application 2008-174918.
PCT International Search Report, Application No. PCT/JP2009/060011; Date Mailed Sep. 8, 2009.

* cited by examiner

*Primary Examiner* — Phuoc Doan
(74) *Attorney, Agent, or Firm* — Michaud-Kinney Group LLP

(57) ABSTRACT

Radio base station equipment is connected to radio transmitting/receiving equipment provided in sectors (S), into which a communication area is divided, by an optical fiber (30), and performs radio communication with mobile terminals located in the respective sectors (S) via the radio transmitting/receiving equipment wherein a delay processing section delays a signal for each sector (S) according to a delay correction value obtained by subtracting a delay amount in each sector (S) from a maximum delay amount of a delay amount measured for each sector (S) and a baseband processing section obtains the signal from each sector (S) delayed by the delay processing section by setting a reception window at a position corresponding to the maximum delay amount.

11 Claims, 7 Drawing Sheets

(a)

(b)

(c)

RADIO BASE STATION EQUIPMENT, RADIO COMMUNICATION SYSTEM AND DELAY CORRECTION METHOD

TECHNICAL FIELD

The present invention relates to radio base station equipment, a radio communication system and a delay correction method, and more particularly, to a radio base station equipment, a radio communication system and a delay correction method for performing radio communication with a mobile station equipment via a radio transmitting/receiving equipment connected by an optical fiber.

BACKGROUND

Conventionally, there is known a radio communication system which divides a communication area managed by radio base station equipment into a plurality of sectors and provides radio transmitting/receiving equipment for each sector. In such a radio communication system, for example, the radio base station equipment is connected to the radio transmitting/receiving equipment by an optical fiber and performs radio communication with mobile station equipment located in the respective sectors via the respective radio transmitting/receiving equipment.

The radio base station equipment in such a radio communication system receives signals transmitted from the same mobile station equipment via different radio transmitting/receiving equipment and combines these received signals to improve reception characteristics of the signals and achieve a good softer handover. In this case, in order to receive signals from respective paths formed between different radio transmitting/receiving equipment and mobile station equipment, the radio base station equipment sets a reception window for receiving signals from the mobile station equipment by considering delays in the radio transmitting/receiving equipment, delays in the optical fibers and delays in the radio channels. That is, the reception window is set so as to be able to receive all signals from the mobile station equipment, the signals received with delays via the radio transmitting/receiving equipments provided in the respective sectors.

SUMMARY

The above described conventional radio base station equipment receives signals from the mobile station equipment by using a reception window that can receive all signals arriving via different reception paths from the mobile station equipment and performs baseband processing including combining processing on these received signals, and therefore requires a high-speed processing circuit for the baseband processing and also requires a large volume memory for storing these signals and has a problem of increasing cost required for hardware to perform baseband processing.

It is an object of the present invention to provide radio base station equipment, radio communication system and a delay correction method capable of performing baseband processing without increasing cost required for hardware even when performing radio communication with mobile station equipment via radio transmitting/receiving equipment connected by an optical fiber.

The radio base station equipment according to the present invention includes radio base station equipment connected to radio transmitting/receiving equipment provided in a sector, into which a communication area is divided by an optical fiber, and performing radio communication with mobile station equipment located in each sector via the radio transmitting/receiving equipment, including a delay correction section configured to delay a signal for each sector according to a delay correction value obtained by subtracting a delay amount of each sector from a maximum delay amount of a delay amount measured for each sector and a baseband processing section configured to obtain the signal from each sector delayed by the delay correction section by setting a reception window at a position corresponding to the maximum delay amount.

In this configuration, a signal is delayed for each sector according to a delay correction value for correcting the delay amount in each sector up to the maximum delay amount and the signal from each sector delayed according to the delay correction value is obtained by using the reception window set at a position corresponding to the maximum delay amount, and thus the signal from each sector can be received without increasing the size of the reception window, and therefore even when radio communication with mobile station equipment is performed via the radio transmitting/receiving equipment connected by an optical fiber, it is possible to perform baseband processing including combining processing of the received signal without increasing the cost required for hardware to perform baseband processing.

The radio base station equipment of the present invention is preferably provided with a delay measuring section configured to measure a delay amount caused between the radio base station equipment and the radio transmitting/receiving equipment for each sector. In this case, the radio base station equipment can measure the delay amount caused between the radio base station equipment and the radio transmitting/receiving equipment for each sector, and can thereby measure the latest delay amount in each sector when the radio base station equipment is operating or when another radio transmitting/receiving equipment is added or the like.

The radio base station equipment of the present invention is preferably provided with a delay correction managing section configured to detect the maximum delay amount from the delay amount measured by the delay measuring section and calculate the delay correction value from the maximum delay amount. In this case, the radio base station equipment can detect the maximum delay amount and calculate the delay correction value as well, and can thereby always obtain an accurate maximum delay amount and delay correction value.

In the radio base station equipment of the present invention, the delay measuring section preferably calculates a delay amount including an optical fiber delay amount in the optical fiber from a measurement result of an in-device delay amount in the radio transmitting/receiving equipment. In this case, since the in-device delay amount and the delay amount including the optical fiber delay amount are calculated, it is possible to accurately calculate a delay amount caused between the radio base station equipment and the radio transmitting/receiving equipment, and thereby perform accurate delay correction on signals from each sector accordingly.

In the radio base station equipment of the present invention, the delay measuring section is preferably configured to calculate a delay amount in each sector from a first time difference between a transmission time of a delay measurement request requesting for a delay measurement for the radio transmitting/receiving equipment and a reception time of a response to the delay measurement request, a downlink in-device delay amount in a reception system block of the radio transmitting/receiving equipment, an uplink in-device delay amount in a transmission system block of the radio transmitting/receiving equipment, and a second time difference between a reception time of the delay measurement request in the radio transmitting/receiving equipment and a transmission time of a response to the delay measurement request, according to the following equation:

Delay amount=(first time difference−second time difference)/2+(downlink in-device delay amount or uplink in-device delay amount, whichever is greater)

In this case, since the delay amount is calculated by using the first time difference which is an actual measured value in the radio base station equipment, the second time difference which is an actual measured value in the radio transmitting/receiving equipment, the downlink in-device delay amount and the uplink in-device delay amount, it is possible to accurately calculate the delay amount caused between the radio base station equipment and the radio transmitting/receiving equipment.

In the radio base station equipment of the present invention, the delay correction section is preferably provided with a transmission delay correction section configured to delay a transmission signal to the mobile station equipment for each sector and a reception delay correction section configured to delay a received signal from the mobile station equipment for each sector. In this case, since a transmission signal to the mobile station equipment and a received signal from the mobile station equipment can be delayed for each sector according to the delay correction value, even when performing radio communication with the mobile station equipment via the radio transmitting/receiving equipment connected by the optical fiber, it is possible to receive a transmission signal by a reception window set in the mobile station equipment.

In the radio base station equipment of the present invention, the baseband processing section is preferably configure to regard a time point at which a signal to the mobile station equipment is outputted to the transmission delay correction section as a transmission timing, regard a time point at which a signal from the mobile station equipment is inputted from the reception delay correction section as a reception timing and calculate RTT (Round Trip Time) in each sector according to the following equation:

RTT=reception timing−transmission timing−(maximum delay amount×2)

In this case, since calculations are carried out by using the transmission timing before delay correction and the reception timing after delay correction as a reference, and the maximum delay amount corresponding to two ways is subtracted, it is possible to accurately calculate RTT by excluding the delay amount in each sector even when performing radio communication with the mobile station equipment via the radio transmitting/receiving equipment connected by the optical fiber.

In the radio base station equipment of the present invention, the baseband processing section is preferably configure to regard a time point at which a signal directed to the mobile station equipment is outputted to the transmission delay correction section as a transmission timing, regard a time point at which a signal from the mobile station equipment is inputted from the reception delay correction section as a reception timing and calculate PD (Propagation Delay) in each sector according to the following equation:

PD=propagation measured value−maximum delay amount

In this case, since calculations are carried out by using the transmission timing before delay correction and reception timing after delay correction as a reference and the maximum delay amount corresponding to one way is subtracted, it is possible to accurately calculate PD by excluding the delay amount in each sector even when performing radio communication with the mobile station equipment via the radio transmitting/receiving equipment connected by the optical fiber.

The radio communication system of the present invention is provided with any one of the above described radio base station equipments and a radio transmitting/receiving equipment having in-device delay measuring section configured to measure the in-device delay amount in response to a request for a delay measurement from the radio base station equipment.

According to this configuration, the radio transmitting/receiving equipment measures an in-device delay amount and the radio base station equipment calculates a delay amount including an optical fiber delay amount according to the measure result, and it is thereby possible to accurately calculate the delay amount caused between the radio base station equipment and the radio transmitting/receiving equipment based on the actual measured value of the radio transmitting/receiving equipment.

The delay correction method for a radio base station equipment of the present invention is a delay correction method for communicating between a radio transmitting/receiving equipment and a radio base station equipment which is connected to the radio transmitting/receiving equipment provided in a sector, in which a communication area is divided, by an optical fiber and performs radio communication with a mobile station equipment and located in each sector via the radio transmitting/receiving equipment, including measuring a delay amount caused between the radio base station equipment and the radio transmitting/receiving equipment, setting a reception window of a baseband processing section at a position corresponding to a maximum delay amount of a delay amount measured for each sector, and delaying a signal for each sector according to the delay correction value obtained by subtracting the delay amount of each sector from the maximum delay amount.

According to this method, the reception window of the baseband processing section is set at a position corresponding to a maximum delay amount of a delay amount measured for each sector and a signal is delayed for each sector according to a delay correction value for correcting the delay amount in each sector up to the maximum delay amount, and it is thereby possible to receive a signal from each sector without increasing the size of the reception window and thereby perform baseband processing including combining processing on the received signal without increasing cost required for hardware to perform baseband processing even when performing radio communication with the mobile station equipment via the radio transmitting/receiving equipment connected by an optical fiber.

The delay correction method for a radio base station equipment of the present invention preferably includes requesting measurement of an in-device delay amount in the radio transmitting/receiving equipment from the radio base station equipment and calculating a delay amount including an optical fiber delay amount in the optical fiber from a measurement result of the in-device delay amount by the radio transmitting/receiving equipment. In this case, the radio transmitting/receiving equipment measures the in-device delay amount and the radio base station equipment calculates the delay amount including the optical fiber delay amount according to the measurement result, and it is thereby possible to accurately calculate the delay amount caused between the radio base station equipment and the radio transmitting/receiving equipment based on the actual measured value of the radio transmitting/receiving equipment.

According to the present invention, a signal is delayed for each sector according to a delay correction value for correcting a delay amount in each sector up to a maximum delay amount and the signal from each sector delayed according to the delay correction value is obtained by the reception window set at a position corresponding to the maximum delay amount, and therefore the signal from each sector can be received without increasing the size of the reception window, and thus, even when radio communication with a mobile station equipment is performed via the radio transmitting/receiving equipment connected by an optical fiber, it is possible to perform baseband processing including combining processing on the received signal without increasing cost required for hardware to perform baseband processing.

DETAILED DESCRIPTION

Hereinafter, embodiments of the present invention will be described in detail with reference to the accompanying drawings.

Figure 1:
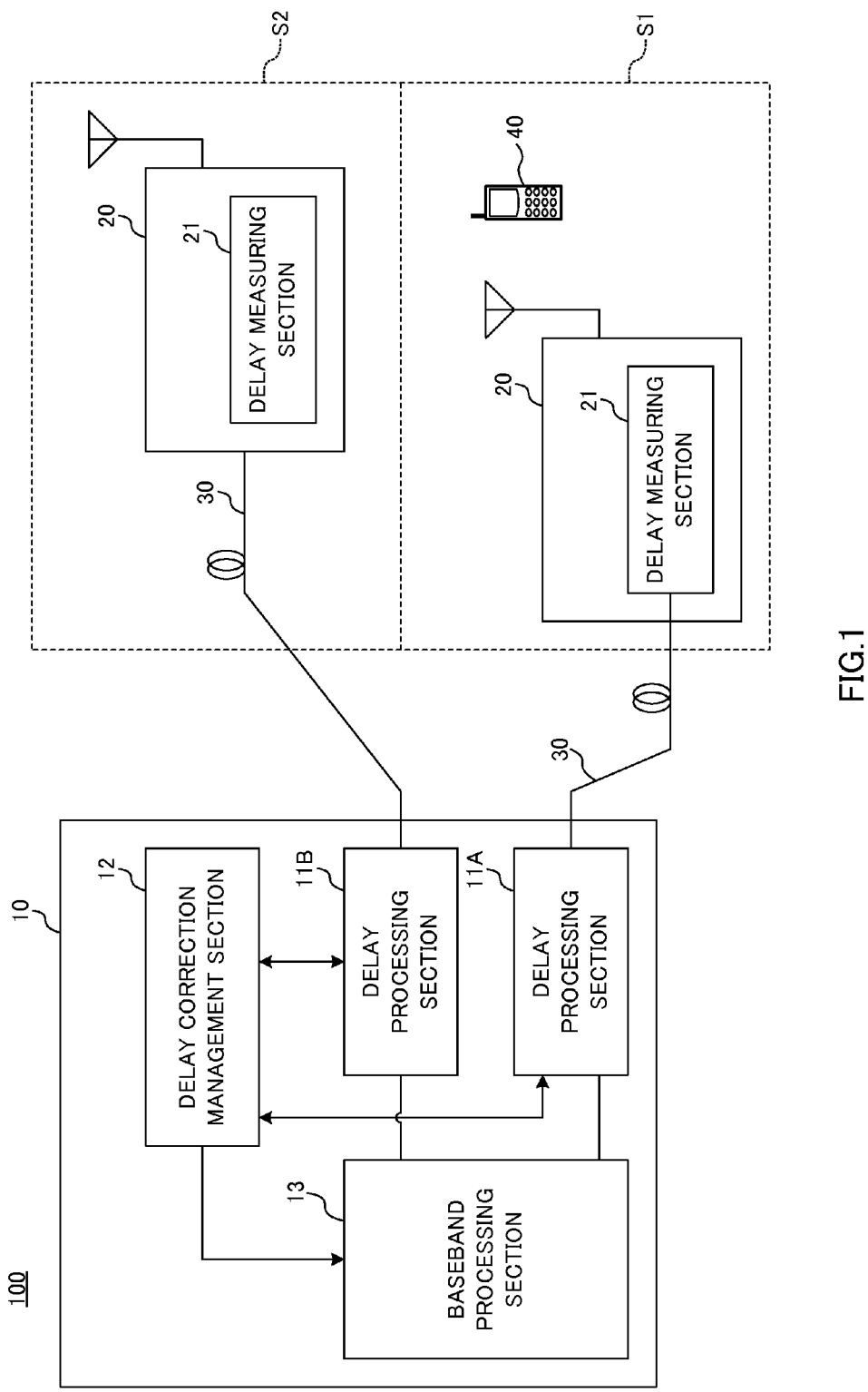
FIG. 1 is a diagram illustrating a network configuration of a radio communication system according to an embodiment of the present invention.

FIG. 1 is a diagram illustrating a network configuration of a radio communication system 100 according to an embodiment of the present invention. As shown in FIG. 1, the radio communication system 100 according to the present embodiment is comprised of a radio base station equipment 10 and a plurality of radio transmitting/receiving equipments 20 connected to the radio base station equipment 10. The radio transmitting/receiving equipment 20 is provided in a plurality of sectors S, into which a communication area managed by the radio base station equipment 10 is divided, and are connected so as to allow two-way communication with the radio base station equipment 10 via optical fibers 30. The radio base station equipment 10 performs radio communication with mobile terminals 40 as mobile station equipments located in the respective sectors S via these radio transmitting/receiving equipments 20. Although FIG. 1 shows a case where the radio base station equipment 10 is connected to the radio transmitting/receiving equipments 20 provided in two sectors S1 and S2, the number of sectors S and the number of radio transmitting/receiving equipments 20 are not limited to this.

When radio communication is performed between the radio base station equipment 10 and the mobile terminal 40, the radio communication system 100 according to the present embodiment detects a signal propagation path (path) formed between the radio transmitting/receiving equipments 20 and the mobile terminals 40 provided in the respective sectors S1 and S2 and combines signals from the mobile terminals 40 in the respective paths. In this case, the radio communication system 100 measures a delay amount caused inside the radio transmitting/receiving equipments 20 provided in the sectors S1 and S2 (hereinafter referred to as "in-device delay amount") and a delay amount caused in the optical fibers 30 (hereinafter referred to as "optical fiber delay amount") and adjusts the position of a reception window in the radio base station equipment 10 based on the in-device delay amount and the optical fiber delay amount. To be more specific, the reception window is set at a position where it is possible to receive a received signal in a path in a sector S having a maximum delay amount (hereinafter referred to as "path having a maximum delay amount" as appropriate) of the measured delay amount (delay amount obtained by summing the in-device delay amount and the optical fiber delay amount). By delaying reception timings of signals from the mobile terminals 40 so as to fit in the reception window based on the in-device delay amount and the optical fiber delay amount corresponding to each sector S, it is possible to combine the received signals from the mobile terminals 4 without increasing the size of the reception window.

As a configuration to achieve this, the radio communication system 100 according to the present embodiment provides a delay processing section 11 and a delay correction management section 12 for the radio base station equipment 10 and also provides a delay measuring section 21 for the radio transmitting/receiving equipment 20. The delay processing section 11 functions as a delay correction section and a delay measuring section and the delay correction management section 12 functions as a delay correction managing section. Furthermore, the delay measuring section 21 functions as an in-device delay measuring section.

The delay processing section 11 is provided in a one-to-one correspondence with the radio transmitting/receiving equipment 20 in each sector S managed by the radio base station equipment 10 (in FIG. 1, delay processing sections 11A and 11B are provided in correspondence with the radio transmitting/receiving equipments 20 in the sectors S1 and S2). The delay processing section 11 calculates a delay amount in the corresponding radio transmitting/receiving equipment 20 (delay amount obtained by summing the in-device delay amount and the optical fiber delay amount) based on a time difference between a transmission time of a delay measurement request transmitted to the radio transmitting/receiving equipment 20 and a reception time of a response to the delay measurement request from the radio transmitting/receiving equipment 20 (hereinafter referred to as "delay measurement response") or the like. The above described delay measurement request is transmitted from the radio base station equipment 10 to the radio transmitting/receiving equipment 20 to request a measurement of a delay amount caused between the radio base station equipment 10 and the radio transmitting/receiving equipment 20. Furthermore, after delaying the signal from the mobile terminal 40 inputted via the radio transmitting/receiving equipment 20 and the optical fiber 30 according to a delay correction value set by the delay correction management section 12 which will be described later, the delay processing section 11 inputs the signal to a baseband processing section 13.

The delay correction management section 12 calculates a maximum delay amount in the delay amount calculated in each delay processing section 11 and also calculates a delay correction value to be set in the delay processing section 11 corresponding to each radio transmitting/receiving equipment 20. This delay correction value is set to delay the received signal from the mobile terminal 40 according to the in-device delay amount and the optical fiber delay amount corresponding to each radio transmitting/receiving equipment 20 and is obtained by subtracting the delay amount corresponding to each radio transmitting/receiving equipment 20 from the above described maximum delay amount. The delay correction management section 12 sets the delay correction value corresponding to each radio transmitting/receiving equipment 20 in the corresponding delay processing section 11 and also reports the maximum delay amount to the baseband processing section 13.

The baseband processing section 13 sets the position of the reception window in the radio base station equipment 10 based on the maximum delay amount reported from the delay correction management section 12. To be more specific, the baseband processing section 13 sets the reception window at a position where it is possible to receive a received signal in a path having a maximum delay amount. A reception window to receive received signals in paths having delay amounts other than the maximum delay amount is offset so as to overlap with the above described reception window and the function is substantially achieved by the reception window which is offset. The reception window set in this way detects a path in each sector S and performs combining processing (maximum ratio combining processing) on the received signals in these paths.

The baseband processing section 13 has functions similar to those of a known baseband processing section 13 (functions such as coding, framing and spread modulation on transmission data for the mobile terminal 40, despreading of received data arriving from the mobile terminal 40 via the radio transmitting/receiving equipment 20 and decoding of received data) except in that the position of the reception window is set according to the maximum delay amount reported from the delay correction management section 12.

Suppose the configurations of the radio base station equipment 10 and the radio transmitting/receiving equipment 20 shown in FIG. 1 are simplified to illustrate the present invention and provided with functions of known radio base station equipment 10 and radio transmitting/receiving equipment 20. For example, the radio transmitting/receiving equipment 20 is provided with a transmission/reception section having an amplifier function, a photoelectric conversion section, an A/D and/or D/A conversion section and an antenna, converts a signal received from the mobile terminal 40 to a digital signal, then converts the digital signal to an optical signal and sends the optical signal to the radio base station equipment 10, and on the other hand, converts an optical signal received from the radio base station equipment 10 to an electric signal, and then converts the electric signal to an analog signal and sends the analog signal to the mobile terminal 40.

The radio base station equipment 10 is provided with a photoelectric conversion section, converts the optical signal inputted via the optical fiber 30 to an electric signal, and on the other hand, converts digital data inputted from the baseband processing section 13 to an optical signal and sends the optical signal to the optical fiber 30. Furthermore, the radio base station equipment 10 is provided with a common control section including a call processing control section having a retransmission control function, a transmission/reception function of a call processing control signal, call processing such as radio channel control and channel setting/release and a resource management function, and a maintenance/monitoring control section having a maintenance/monitoring signal transmission/reception function and a state management function for the radio base station equipment 10.

Figure 2:
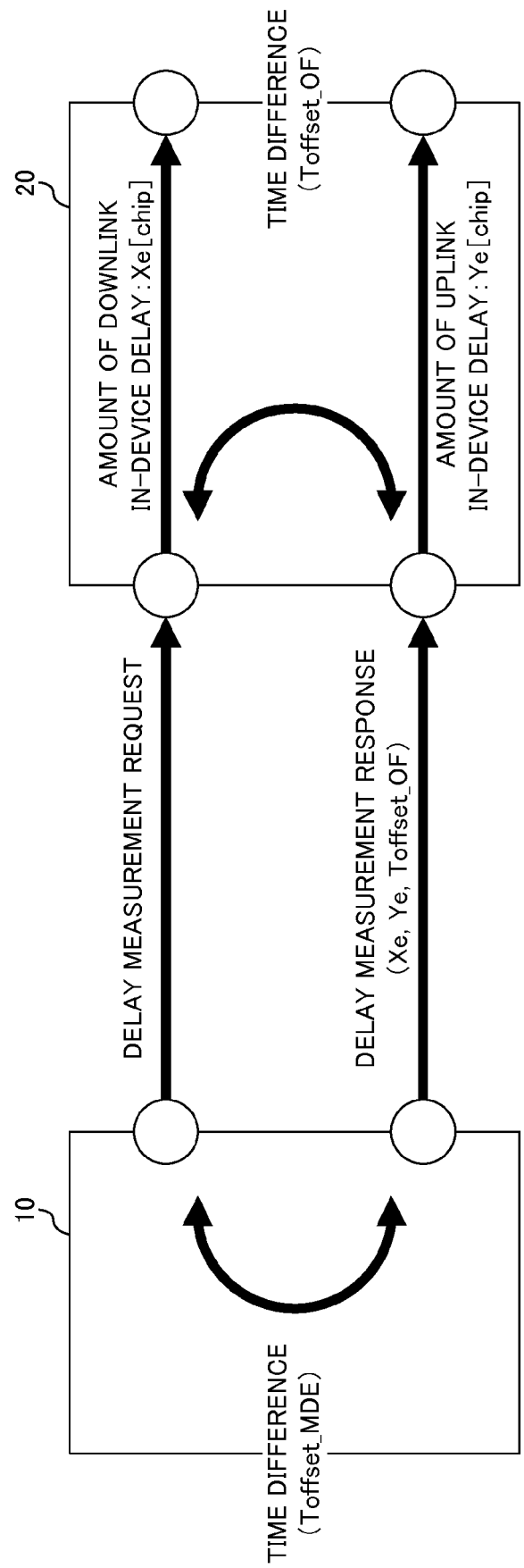
FIG. 2 is a schematic diagram illustrating an operation when the radio communication system according to the above described embodiment calculates a delay amount corresponding to each radio transmitting/receiving equipment.

Here, in the radio communication system 100 according to the present embodiment, operation when calculating a delay amount corresponding to each radio transmitting/receiving equipment 20 will be described. FIG. 2 is a schematic diagram illustrating operation of the radio communication system 100 according to the present embodiment when calculating a delay amount corresponding to each radio transmitting/receiving equipment 20. The technique for calculating the delay amount shown below illustrates an example and the present invention is not limited to this. The calculation technique can be changed as long as it is possible to calculate the optical fiber delay amount and the in-device delay amount corresponding to each radio transmitting/receiving equipment 20.

As shown in FIG. 2, when a delay amount between the radio base station equipment 10 and the radio transmitting/receiving equipment 20 connected thereto is calculated, the radio base station equipment 10 sends a delay measurement request to the radio transmitting/receiving equipment 20. In this case, the delay processing section 11 of the radio base station equipment 10 records a transmission time of the delay measurement request. The delay measurement request is sent from, for example, the maintenance/monitoring control section of the common control section (not shown) in the radio base station equipment 10, but the present invention is not limited to this.

Upon receiving the delay measurement request, the delay measuring section 21 measures an in-device delay amount (hereinafter referred to as "downlink in-device delay amount") $Xe$ [chip] in the reception system block in the radio transmitting/receiving equipment 20 first. In this case, the delay measuring section 21 records the reception time of the delay measurement request. Next, the delay measuring section 21 measures an in-device delay amount (hereinafter referred to as "uplink in-device delay amount") $Ye$ [chip] in the transmission system block in the radio transmitting/receiving equipment 20. A delay measurement response is then sent to the radio base station equipment 10. In this case, the delay measuring section 21 calculates a time difference Toffset_OF between a transmission time of the delay measurement response and a reception time of the delay measurement request and includes the time difference in the delay measurement response. In addition, the delay measurement response includes a downlink in-device delay amount $Xe$ and an uplink in-device delay amount $Ye$.

Upon receiving this delay measurement response, the delay processing section 11 calculates a time difference Toffset_MDE between a transmission time of the delay measurement request and a reception time of the delay measurement response. The delay processing section 11 then calculates a delay amount with respect to the radio transmitting/receiving equipment 20 based on this time difference Toffset_MDE and a response result included in the delay measurement response. In this case, the delay amount is calculated by the following equation.

$$\text{Delay amount} = (T\text{offset\_MDE} - T\text{offset\_OF})/2 + \text{MAX}\{Xe, Ye\}$$

where suppose MAX{Xe, Ye} is a function that calculates a value of Xe or Ye, whichever is greater. According to this calculation equation, a delay amount in one direction between the radio base station equipment 10 and the radio transmitting/receiving equipment 20 is calculated. Such a delay amount is calculated for all the radio transmitting/receiving equipments 20 connected to the radio base station equipment 10.

Thus, since the delay processing section 11 calculates a delay amount including the optical fiber delay amount from the measurement result of the in-device delay amount in the delay measuring section 21, it is possible to accurately calculate the delay amount caused between the radio base station equipment 10 and the radio transmitting/receiving equipment 20 and thereby perform more accurate delay correction of the signal from each sector S. Especially, since the delay amount is calculated by using the time difference Toffset_MDE which is an actual measured value in the radio base station equipment 10 and the time difference Toffset_OF which is an actual measured value in the radio transmitting/receiving equipment 20, the downlink in-device delay amount Xe and the uplink in-device delay amount Ye, it is possible to accurately calculate the delay amount caused between the radio base station equipment 10 and the radio transmitting/receiving equipment 20.

Figure 3:
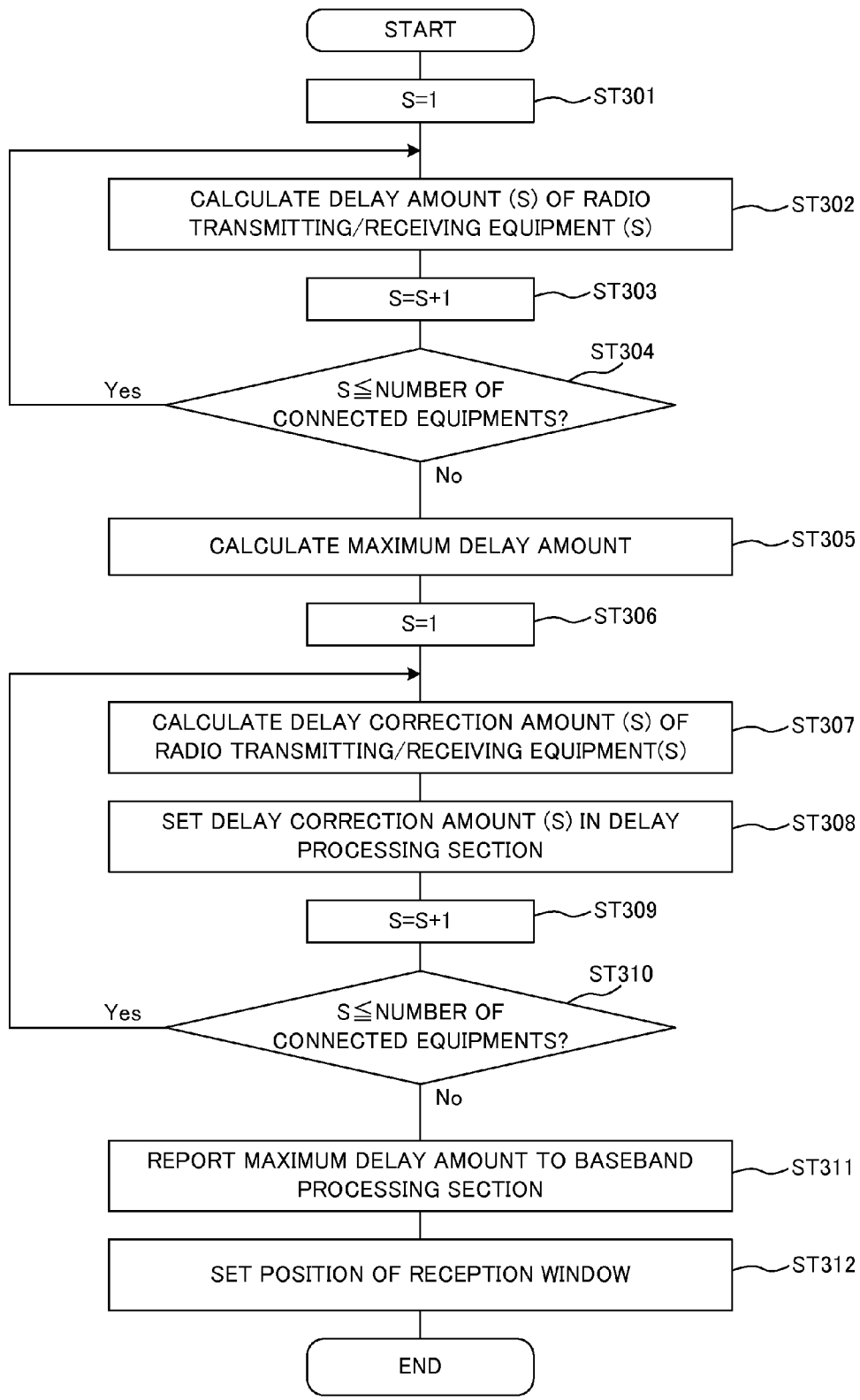
FIG. 3 is a flowchart illustrating an operation when the radio base station equipment according to the above described embodiment sets a delay set value to each delay processing section and also sets the position of a reception window.

Next, in the radio base station equipment 10 according to the present embodiment, the operation for setting a delay set value to each delay processing section 11 and setting the position of the reception window will be described. FIG. 3 is a flowchart illustrating the operation for setting the delay set value to each delay processing section 11 and setting the position of the reception window in the radio base station equipment 10 according to the present embodiment. The operation flow of the radio base station equipment 10 shown in FIG. 3 is performed when, for example, the radio base station equipment 10 is started and when the radio transmitting/receiving equipment 20 connected to the radio base station equipment 10 is added or is modified. The reception window is always set at a desired position. Here, a case will be described where the radio base station equipment 10 is started and the flow shown in FIG. 3 is performed.

Once the radio base station equipment 10 is started, the maintenance/monitoring control section of the common control section sets an identification value S of the radio transmitting/receiving equipment 20, which is targeted for calculation of its delay amount, to an initial value (1) at first (step (hereinafter referred as "ST") 301). The maintenance/monitoring control section instructs the corresponding delay processing section 11 to calculate the delay amount of the radio transmitting/receiving equipment 20 and sends a delay measurement request to the radio transmitting/receiving equipment 20.

Upon receiving the instruction for calculating the delay amount, the delay processing section 11 calculates the delay amount with respect to the corresponding radio transmitting/receiving equipment 20 according to the procedure shown in FIG. 2 (ST302). That is, based on the downlink in-device delay amount Xe and the uplink in-device delay amount Ye included in the delay measurement response and the time difference Toffset_OF and the time difference Toffset_MDE calculated by itself, the delay amount is calculated according to the above described calculation equation. The delay amount calculated in this way is outputted to the delay correction management section 12. The delay correction management section 12 manages this in association with the corresponding radio transmitting/receiving equipment 20.

The delay amount of the corresponding radio transmitting/receiving equipment 20 is outputted to the delay correction management section 12, and then that fact is reported to the maintenance/monitoring control section. Upon receiving this report, the maintenance/monitoring control section increments the identification value S of the radio transmitting/receiving equipment 20 (ST303), and determines whether the identification value S is equal to or below the number of radio transmitting/receiving equipments (hereinafter referred to as "the number of connected equipments") connected to the radio base station equipment 10 (ST304). When the identification value S is equal to or below the number of connected equipments here, the processing in ST302 and ST303 is performed again. By repeating such processing, delay amounts of the radio transmitting/receiving equipments 20 connected to the radio base station equipment 10 are added to management targets by the delay correction management section 12.

In ST304, when the identification value S is not equal to or below the number of connected equipments, that is, when the identification value S exceeds the number of connected equipments, that fact is reported to the delay correction management section 12. Upon receiving this report, the delay correction management section 12 calculates the maximum delay amount among delay amounts of all the radio transmitting/receiving equipments 20 under management (ST305). In this case, the maximum delay amount is calculated by the following equation.

Delay amount=MAX{delay amount (1), delay amount (2) . . . delay amount (S)} where suppose MAX{delay amount (1), delay amount (2) . . . delay amount (S)} is a function that calculates the maximum amount of delay amount (1), delay amount (2) . . . delay amount (S).

When the maximum delay amount is calculated, the delay correction management section 12 sets the identification value S of the radio transmitting/receiving equipment 20 to the initial value (1) at first, in order to calculate the delay correction value of each radio transmitting/receiving equipment 20 (ST306). The delay correction management section 12 then subtracts the delay amount of the corresponding radio transmitting/receiving equipment 20 from the maximum delay amount to calculate a delay correction value (ST307). In this case, the delay correction amount (1) to the delay correction amount (S) are calculated, for example, by the following equation.

Delay correction amount (1)=maximum delay amount−delay amount (1)

Delay correction amount (2)=maximum delay amount−delay amount (2)

Delay correction amount (S)=maximum delay amount−delay amount (S)

The delay correction management section 12 sets the delay correction value (here, delay correction value (1)) calculated in this way in the corresponding delay processing section 11 (ST308).

After setting the delay correction value in the delay processing section 11, the delay correction management section 12 increments the identification value S of the radio transmitting/receiving equipment 20 (ST309) and determines whether the identification value S is equal to or below the number of connected equipments (ST310). Here, when the identification value S is equal to or below the number of connected equipments, the delay correction management section 12 performs the processing in ST307 to ST309 again. By repeating such processing, a delay correction value corresponding to the radio transmitting/receiving equipment 20 is set in each delay processing section 11.

In ST310, when the identification value S is not equal to or below the number of connected equipments, that is, when the identification value S exceeds the number of connected equipments, the delay correction management section 12 reports the maximum delay amount calculated in ST305 to the baseband processing section 13 (ST311). Upon receiving this report, the baseband processing section 13 sets the reception window at a position to receive a received signal in the path having the maximum delay amount (ST312). After such a series of processes, the radio base station equipment 10 sets a delay set value in each delay processing section 11 and the operation of setting the position of the reception window is finished.

Thus, the radio base station equipment 10 according to the present embodiment sets a delay correction value according to the corresponding radio transmitting/receiving equipment 20 in each delay processing section 11, and can thereby reduce the time difference in reception timing between paths in the respective sectors S. In this case, since the delay correction value is calculated by subtracting the delay amount corresponding to each radio transmitting/receiving equipment 20 from the maximum delay amount, reception timings of other paths are offset-corrected to the reception timing of the path having the maximum delay amount. On the other hand, since the reception window is set at a position to receive a received signal of the path having the maximum delay amount, it is possible to detect the path of each sector S whose reception timing is delayed and thereby reliably perform combining processing (maximum ratio combining processing) on received signals of these paths without increasing the size of the reception window.

In the radio base station equipment 10 according to the present embodiment, the reception window can be set, for example, to a width in consideration of only the delay amount that can be caused in the radio zone of the mobile terminal 40. This eliminates the necessity of setting the reception window to a width in consideration of fixed delays other than the radio zone, that is, in-device delay and optical fiber delay as in the case of the conventional radio base station equipment, and can thereby perform baseband processing including combining processing of received signals from the mobile terminals 40 without increasing cost required for hardware to perform baseband processing even when performing radio communication with the mobile terminal 40 via the radio transmitting/receiving equipment 20 connected by the optical fiber 30.

Figure 4:
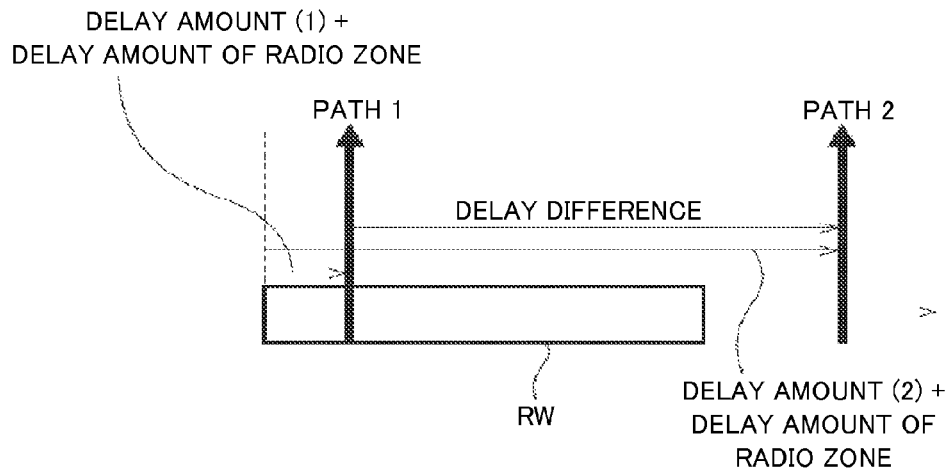
FIG. 4 is a schematic diagram illustrating a relationship between a delay amount correction of a signal from the mobile terminal and the reception window on the network shown in FIG. 1.
Figure 4:
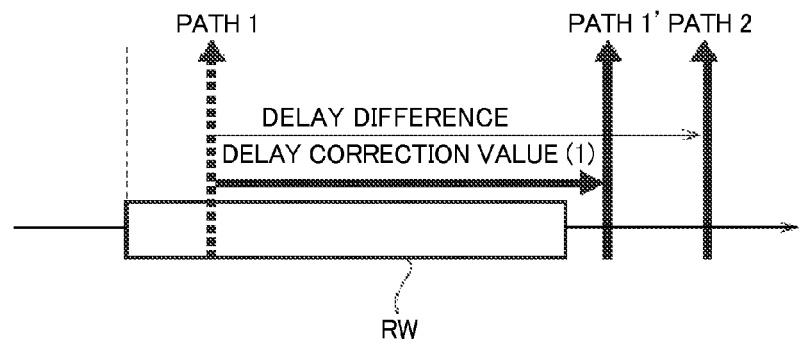
Figure 4:
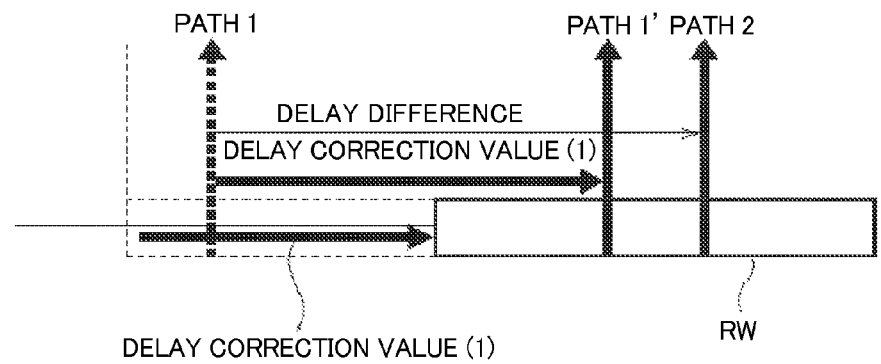

Hereinafter, a relationship between a delay amount correction of a signal from the mobile terminal 40 and the reception window will be described by using the configuration of connection between the radio base station equipment 10 and the radio transmitting/receiving equipment 20 in the radio communication system 100 shown in FIG. 1. FIG. 4 is a schematic diagram illustrating a relationship between the delay correction amount of a signal from the mobile terminal 40 and the reception window on the network shown in FIG. 1. In FIG. 4, suppose there is one path via which a signal is received from the mobile terminal 40 in each of the sectors S1 and S2. Furthermore, suppose signals received via the paths in the sectors S1 and S2 are called "path 1" and "path 2" respectively for convenience of explanation. Moreover, the reception window is represented by "RW" and the width thereof is set to a width in consideration of only a delay amount that can occur in the radio zone. Suppose there is a delay difference exceeding the reception window set in the radio base station equipment 10 between path 1 and path 2.

When there is a delay difference exceeding the reception window set in the radio base station equipment 10 between path 1 and path 2, although path 1 can be detected, path 2 is gone off the reception window and path 2 cannot be detected as shown in FIG. 4(a). In this case, it is difficult to combine received signals of path 1 and path 2.

The radio communication system 100 according to the present embodiment calculates a delay amount (1) from the radio transmitting/receiving equipment 20 in the sector S1 and a delay amount (2) from the radio transmitting/receiving equipment 20 in the sector S2 and sets a delay correction value obtained by subtracting the respective delay amounts from the maximum delay amount (here, delay amount (2)) in the delay processing sections 11A and 11B. Here, the value obtained by subtracting the delay amount (1) from the delay amount (2) which is the maximum delay amount is set in the delay processing section 11A as the delay correction value (1). Since the delay processing section 11B need not correct the delay amount, for example, "0" is set as the correction value (2).

Thus, when the delay correction value (1) is set in the delay processing section 11A, if a signal is transmitted from the mobile terminal 40 via the sector 1, path 1 is delayed by a time corresponding to the delay correction value (1) as shown in FIG. 4(b). That is, as shown in FIG. 4(b), path 1 is delayed by the delay correction value (1) and received as path 1'.

The radio base station equipment 10 sets the reception window in the baseband processing section 13 at a position to receive path 2 having a maximum delay amount. Path 1' is detected by the reception window set in this way. In this regard, path 1' can be regarded as having been detected by the reception window to receive path 1. Here, the reception window is offset backward by a time corresponding to the delay correction value (1) as shown in FIG. 4(c). Path 2 is likewise detected by the reception window set in this way. In this case, since path 1' delayed by the time corresponding to the delay correction value (1) and path 2 can be detected by the reception window to receive path 2 having a maximum delay amount, the received signals in path 1 (path 1') and path 2 can be combined.

Thus, the radio communication system 100 according to the present embodiment calculates a delay amount corresponding to the radio transmitting/receiving equipments 20 provided in the sectors S1 and S2, sets delay correction values (1) and (2) according to respective delay amounts based on the maximum delay amount in the delay processing sections 11A and 11B and sets the reception window in the baseband processing section 13 at a position to receive a path having the maximum delay amount. Thus, a received signal is delayed for each sector S according to a delay correction value that corrects the delay amount in each sector S up to a maximum delay amount and the signal from each sector S delayed according to the delay correction value is obtained by the reception window set at a position according to the maximum delay amount, and it is thereby possible to detect path 1' resulting from delaying reception timing of path 1 and path 2 without increasing the size of the reception window, and thereby perform baseband processing including combining processing on the received signals without increasing cost required for hardware to perform baseband processing.

Furthermore, the radio communication system 100 according to the present embodiment can detect path 1' resulting from delaying reception timing of path 1 and path 2 without increasing the size of the reception window, and can thereby achieve handover (softer handover) that switches between the radio transmitting/receiving equipments 20 according to the position of the mobile terminal 4 at low cost without requiring a reception window that can receive all signals transmitted with a delay from the mobile terminal 40 as in the case of the conventional radio communication system.

Furthermore, in the radio communication system 100 according to the present embodiment, the delay measuring section 21 measures an in-device delay in the radio transmitting/receiving equipment 20, sets a delay correction value reflecting this in the delay processing section 11 corresponding to the radio transmitting/receiving equipment 20, and it is thereby possible to flexibly correct the delay amount that may occur in each sector S and detect a signal from the mobile terminal 40, even when the specification of the radio transmitting/receiving equipment 20 is different (for example, when it is manufactured by a different manufacturer and has a unique specification).

The radio communication system 100 according to the present embodiment has the radio base station equipment 10 provided with the delay processing section 11 that measures a delay amount caused between the radio base station equipment 10 and the radio transmitting/receiving equipment 20 for each sector S, and can thereby measure the latest delay amount in each sector S when the radio base station equipment 10 is operating or when another radio transmitting/receiving equipment 20 is added or the like. Furthermore, since the radio base station equipment 10 is provided with the delay correction management section 12 that detects a maximum delay amount from the delay amount measured by the delay processing section 11 and calculates a delay correction value from this maximum delay amount, and can thereby always acquire an accurate maximum delay amount and delay correction value.

RTT (Round Trip Time) or PD (Propagation Delay) specified in the 3GPP (3rd Generation Partnership Project) is measured by the baseband processing section in the radio base station equipment. Here, RTT indicates a time difference between transmission timing and reception timing in DPCH (Dedicated Physical Channel), and PD indicates one-way propagation delay amount in PRACH (Physical Random Access Data Channel). RTT and PD are measured by assuming an antenna connector end as a specified point and used to measure the distance from the antenna connector end to the mobile station equipment.

However, as in the case of the above described embodiment, in the radio communication system 100 that performs radio communication with the mobile terminal 40 located in the sector S via the radio transmitting/receiving equipment 20 provided in the sector S, the radio transmitting/receiving equipment 20 is provided with an antenna having an antenna connector end, and thus, PD and RTT are measured as values increased by a delay amount including that of the optical fiber 30 or the like, and therefore it is difficult to measure an accurate distance from the antenna connector end to the mobile terminal 40.

Particularly when radio communication with the mobile terminal 40 is performed via a plurality of radio transmitting/receiving equipments 20 (here, two radio transmitting/receiving equipments 20) and when there is a delay difference between paths which are formed between the different radio transmitting/receiving equipments 20 and the mobile terminal 40, the radio base station equipment 10 needs to set a reception window so that all signals from the mobile terminals 40 transmitted with a delay via each radio transmitting/receiving equipment 20 can be received. It causes a large burden in terms of cost as described above.

Furthermore, some mobile terminals 40 even may not be able to detect a signal from the radio base station equipment 10. This occurs when the delay difference between paths, which are formed between different radio transmitting/receiving equipments 20 and mobile terminal 40, exceeds the reception window set in the mobile terminal 40. In this case, since the mobile terminal 40 cannot receive a signal from the radio base station equipment 10, it is impossible to measure RTT or PD in the path.

These problems can be solved by applying the radio communication system 100 according to the present embodiment. To be more specific, as described above, these problems can be solved by delaying the received signal from the mobile terminal 40 in the radio base station equipment 10, adjusting the position of the reception window in the radio base station equipment 10 based on a maximum delay amount and further utilizing the delay amount of the radio transmitting/receiving equipment 20 managed by the delay correction management section 12 to delay a transmission signal to the mobile terminal 40.

Figure 5:
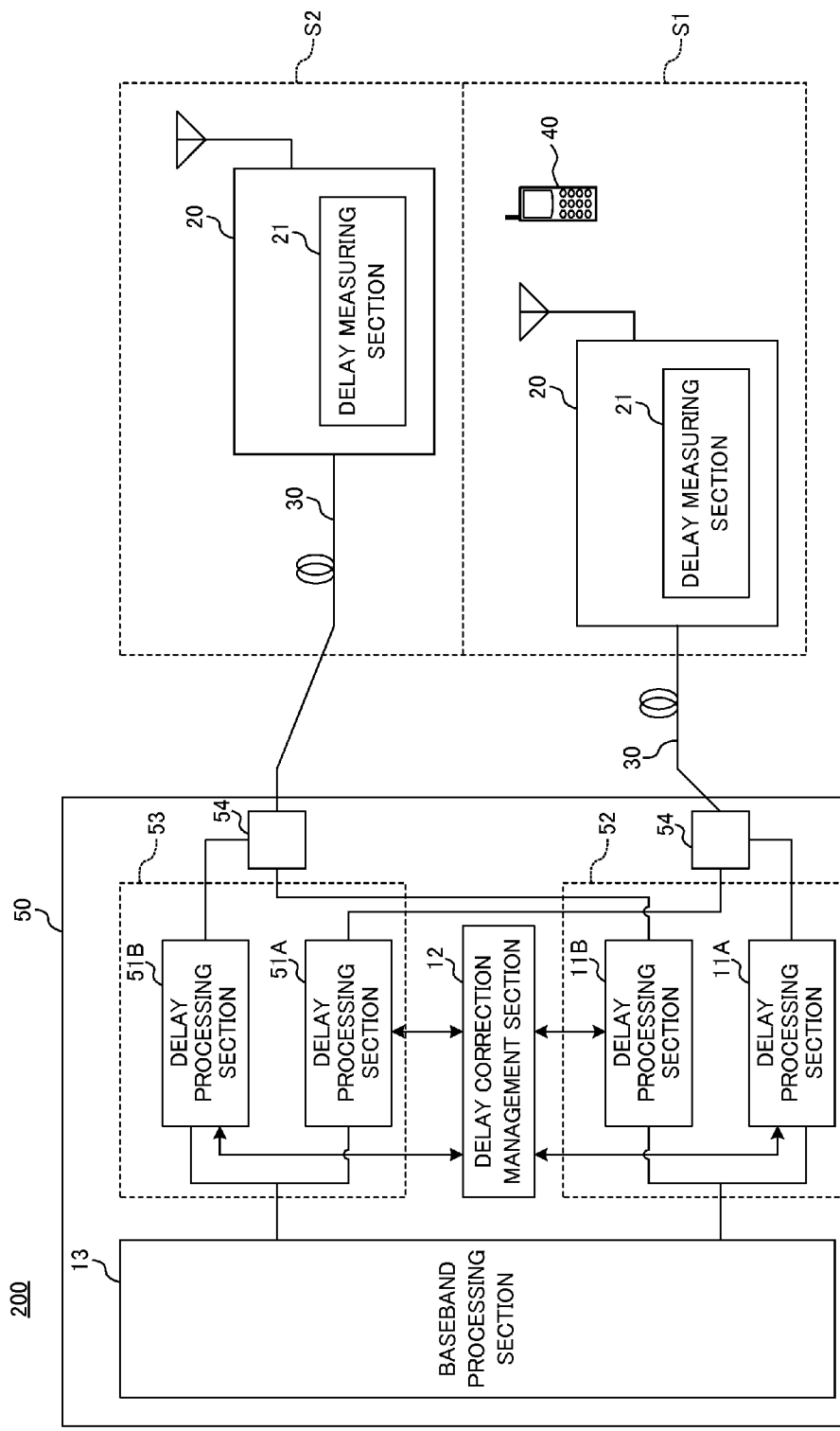
FIG. 5 is a diagram illustrating a network configuration of a radio communication system according to an application example of the above described embodiment.

FIG. 5 is a diagram illustrating a network configuration of a radio communication system 200 according to an application example of the present embodiment. In FIG. 5, same configuration as FIG. 1 will be assigned the same reference numerals and descriptions thereof will be omitted. In addition to the same configuration as the radio base station equipment 10 according to the above described embodiment, a radio base station equipment 50 of the radio communication system 200 is provided with a delay processing section 51 as a configuration for delaying transmission timing of a signal to the mobile terminal 40 by using a delay amount of a radio transmitting/receiving equipment 20 managed by a delay correction management section 12. In the radio base station equipment 50, delay processing sections 11A and 11B are provided in a reception system block 52, while delay processing sections 51A and 51B are provided in a transmission system block 53. In this case, the delay processing sections 51A and 51B function as transmission delay correction sections, while the delay processing sections 11A and 11B function as reception delay correction sections.

The delay processing section 51 is provided in correspondence with the radio transmitting/receiving equipment 20 in each sector S managed by the radio base station equipment 50 (in FIG. 5, the delay processing sections 51A and 51B are provided in correspondence with the radio transmitting/receiving equipments 20 in sectors S1 and S2). A delay correction value calculated by the delay correction management section 12 is set in the delay processing section 51 as in the case of the delay processing section 11. After delaying a signal to be transmitted from a baseband processing section 13 to a mobile terminal 40 according to this delay correction value, the delay processing section 51 transmits the signal to an optical fiber 30 via a photoelectric conversion section 54. In this case, since the delay processing section 51 can delay a transmission signal to the mobile terminal 40 for each sector S according to the delay correction value, even when radio communication with the mobile terminal 40 is performed via the radio transmitting/receiving equipment 20 connected by the optical fiber 30, the transmission signal can be received by a reception window set in the mobile terminal 40. Unlike the delay processing section 11, the delay processing section 51 is not provided with the function of calculating a delay amount in the corresponding radio transmitting/receiving equipment 20.

The delay correction management section 12 in the radio base station equipment 50 has a function of setting a delay correction value calculated in correspondence with the radio transmitting/receiving equipment 20 in both the delay processing section 11 and the delay processing section 51.

When measuring RTT or PD, the baseband processing section 13 sets the position of the reception window in the radio base station equipment 1 based on a maximum delay amount reported from the delay correction management section 12. To be more specific, the baseband processing section 13 transmits a signal to the mobile terminal 40 via a path having the maximum delay amount and also sets the reception window at a position to receive a signal from the mobile terminal 40 via the path. The radio base station equipment 10 according to the above described embodiment takes the maximum delay amount corresponding to one way into consideration, whereas the radio base station equipment 50 takes the maximum delay amount corresponding to two ways into consideration.

Figure 6:
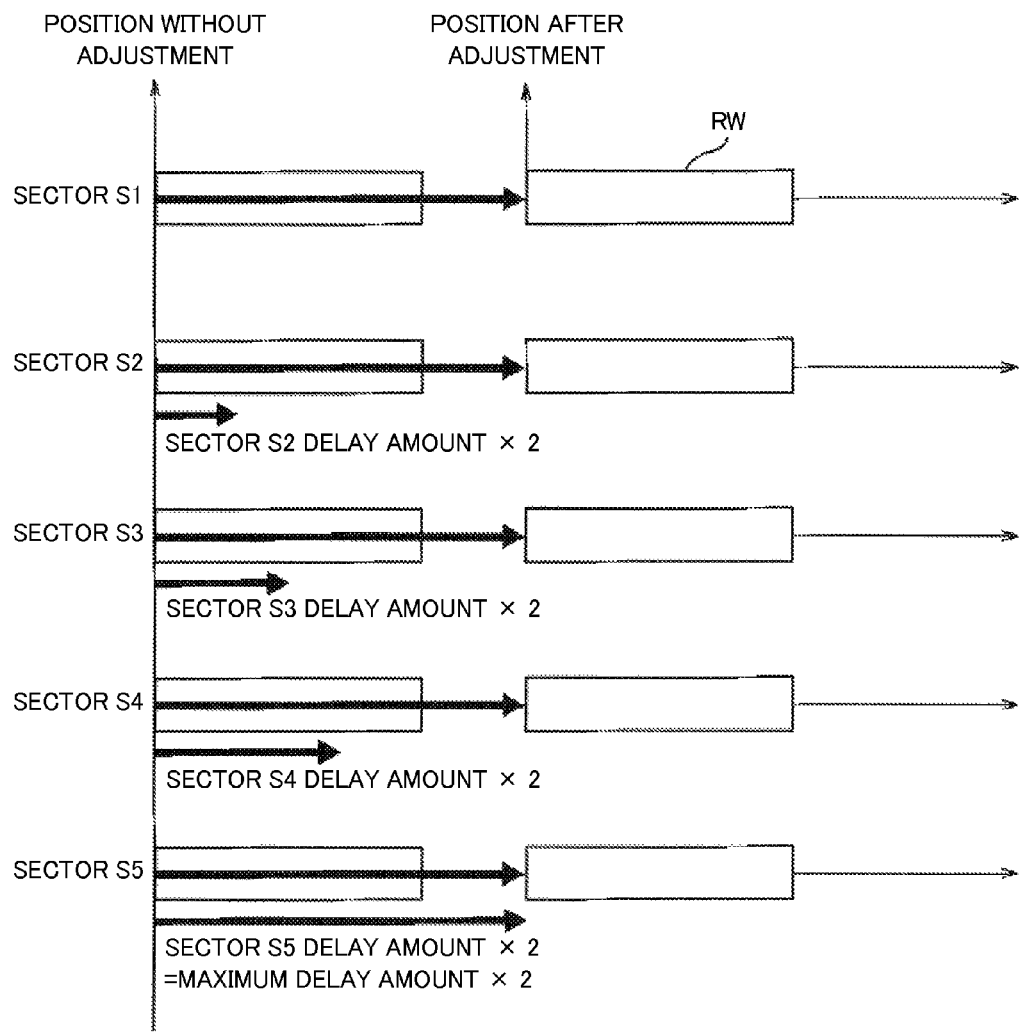
FIG. 6 is a diagram illustrating an adjustment amount of the reception window in the radio communication system according to the application example of the above described embodiment.

As in the case described above, the position of the reception window to receive a received signal of a path having a delay amount other than the maximum delay amount is offset so as to overlap with the above described reception window, and the function is substantially achieved by the reception window which is offset. When, for example, there are a plurality of sectors S of different delay amounts, the reception window to receive a received signal of a path in each sector S is overlapped with a reception window which is offset by a time corresponding to two ways of the maximum delay amount irrespective of the delay amount in each sector S. As shown in FIG. 6, when there are sector S1 to sector S5 including the sector S1 where there is no delay amount and the sector S5 where the delay amount is maximum, the reception window is overlapped at a position offset by a time corresponding to two ways of the maximum delay amount (delay amount in the sector S5) irrespective of the delay amount in the sector 1 to sector 4.

Furthermore, the baseband processing section 13 designates a time point at which a signal to the mobile terminal 40 is outputted to the transmission system block 53 and a time point at which a signal from the mobile terminal 40 is inputted from the reception system block 52 as specified points and calculates RTT by utilizing the maximum delay amount managed by the delay correction management section 12. To be more specific, the baseband processing section 13 regards the time point at which a signal to the mobile terminal 40 is outputted to the transmission system block 53 as a transmission timing, and on the other hand, regards the time point at which a signal from the mobile terminal 40 is inputted from the reception system block 52 as a reception timing and calculates RTT according to the following equation:

$$RTT = \text{reception timing} - \text{transmission timing} - (\text{maximum delay amount} \times 2)$$

Furthermore, the baseband processing section 13 calculates PD by using the Propagation measured value measured by a known technique and the maximum delay amount managed by the delay correction management section 12. To be more specific, PD is calculated according to the following equation:

$$PD = \text{Propagation measured value} - \text{maximum delay amount}$$

Figure 7:
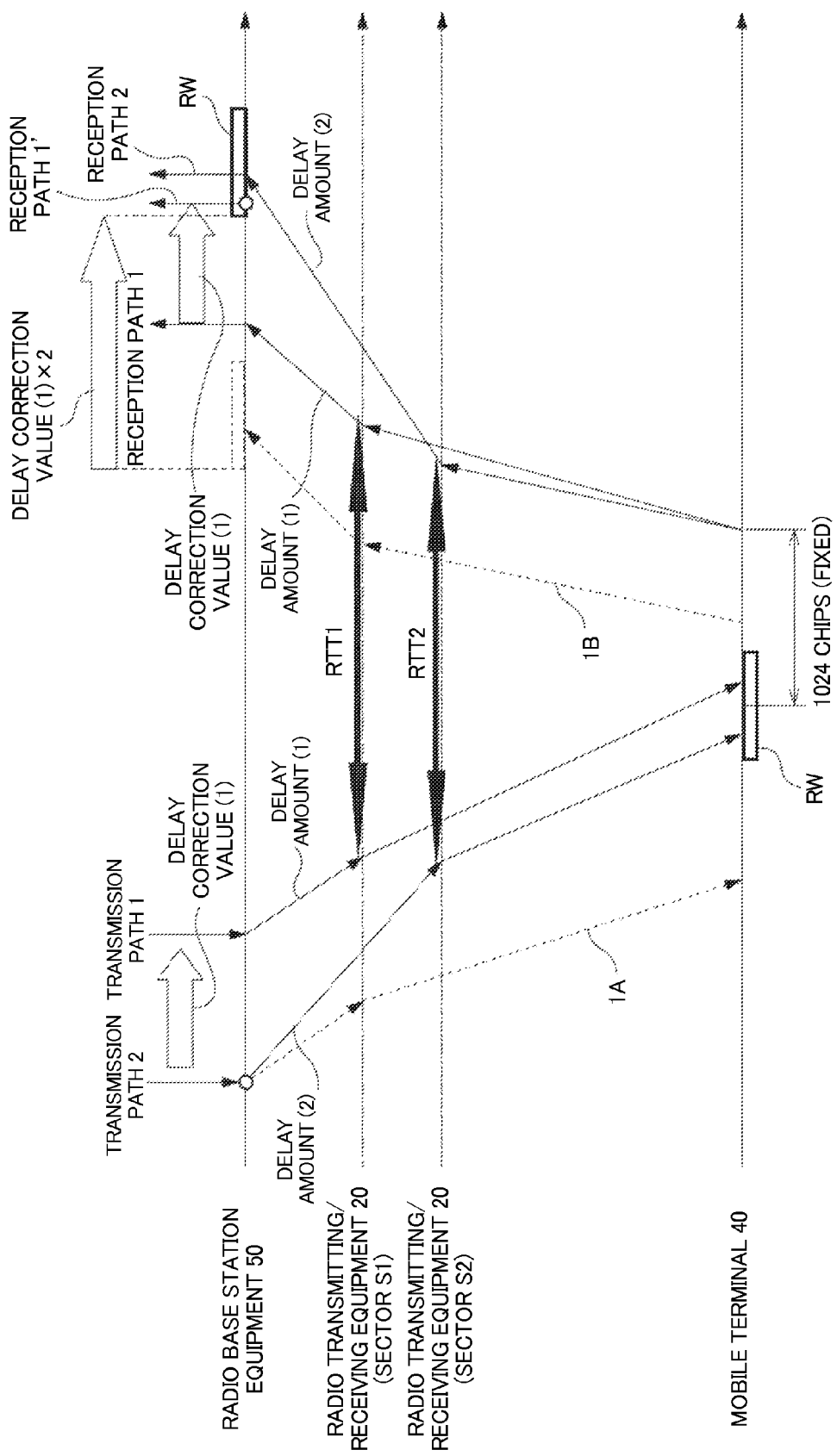
FIG. 7 is a diagram illustrating a delay amount correction of a transmission signal and a received signal when the radio communication system according to the application example of the above described embodiment measures RTT.

Hereinafter, delay correction amounts of a transmission signal and a received signal when RTT is measured in the radio communication system 200 will be described. FIG. 7 is a diagram illustrating delay correction amounts of a transmission signal and a received signal when RTT is measured in the radio communication system 200. Here, delay correction amounts of a transmission signal and a received signal in a configuration of connection between the radio base station equipment 50 and the radio transmitting/receiving equipment 20 in the radio communication system 200 shown in FIG. 5 will be shown and the maximum delay amount is the delay amount (2) in the sector 2. Therefore, a value obtained by subtracting the delay amount (1) in the sector 1 from the maximum delay amount is set in the delay processing sections 11A and 51A in the radio base station equipment 50 as a delay correction value (1), and "0" is set in the delay processing sections 11B and 51B as a delay correction value (2).

In FIG. 7, there is one path through which a signal is transmitted to the mobile terminal 40 and there is one path through which a signal is received from the mobile terminal 40 via the sectors S1 and S2. For convenience of explanation, signals transmitted through paths in the sectors S1 and S2 to the mobile terminal 40 are called "transmission path 1" and "transmission path 2" respectively and signals received from the mobile terminal 40 through paths in the sectors S1 and S2 are called "reception path 1" and "reception path 2" respectively. Furthermore, the reception windows in the radio base station equipment 50 and the mobile terminal 40 are represented by "RW" and set to a width in consideration of only the delay amount that can be caused in the radio zone. Further, there is a delay difference that exceeds the reception window set in the radio base station equipment 50 and the mobile terminal 40 between the transmission path 1 (reception path 1) and the transmission path 2 (reception path 2). Furthermore, a signal to the radio base station equipment 50 is sent after a lapse of a predetermined time (here, 1024 chips) from an intermediate time point of the reception window in the mobile terminal 40.

When a signal from the baseband processing section 13 of the radio base station equipment 50 to the mobile terminal 40 is inputted to the transmission system block 53, the signal is sent to the optical fiber 30 via the delay processing sections 51A and 51B. In this case, the transmission path 1 is delayed from the transmission path 2 by a time corresponding to the delay correction value set in the delay processing section 51A, and the delayed signal is transmitted. On the other hand, the transmission path 2 is sent to the optical fiber 30 without delays. Thus, the transmission timing of the transmission path 1 is delayed to secure the detection of the transmission path 1 in the reception window of the mobile terminal 40. When the transmission timing of the transmission path 1 is not delayed, the signal is gone off the reception window in the mobile terminal 40 as shown by a broken line 1A.

Thus, by delaying the transmission timing of the transmission path 1, the transmission path 1 and transmission path 2 are detected in the reception window in the mobile terminal 40. After a lapse of a predetermined time from the intermediate time point of the reception window, a signal directed to the radio base station equipment 50 is sent simultaneously. In this case, the reception path 1 is delayed by a time corresponding to the delay amount (1) and reaches the radio base station equipment 50, and the reception path 2 is delayed by a time corresponding to the delay amount (2) and reaches the radio base station equipment 50. FIG. 7 shows the timing of a signal transmitted from the mobile terminal 40 to the radio base station equipment 50 with a broken line 1B when the transmission path 1 is received by the mobile terminal 40 without causing the transmission timing of the transmission path 1 to delay.

The signal from the mobile terminal 40 is inputted to the reception system block 52 of the radio base station equipment 50 and inputted to the baseband processing section 13 via the delay processing sections 11A and 11B. In this case, the reception path 1 is inputted to the baseband processing section 13 as a reception path 1' delayed by a time corresponding to the delay correction value (1) set in the delay processing section 11A. Since "0" has been set in the delay processing section 11B as the delay correction value (2), the reception path 2 is inputted to the baseband processing section 13 without any delay.

As described above, in the baseband processing section 13, the position of the reception window is adjusted based on the maximum delay amount reported from the delay correction management section 12. To be more specific, the reception window is set at a position to receive the reception path 2 having a maximum delay amount. The reception path 1' is detected by the reception window set in this way. In this respect, as shown in FIG. 7, the path 1' can be regarded as having been detected by the reception window to receive the path 1 which is offset backward by a time corresponding to double of the delay correction value (1). The reception path 2 is likewise detected by the reception window set in this way. In this case, the baseband processing section 13 can detect the reception path 1' delayed by a time corresponding to the delay correction value (1) and reception path 2, by using the reception window to receive the reception path 2 having the maximum delay amount.

The baseband processing section 13 then calculates RTT according to the above described equation by using the transmission timings of such transmission path 1 and transmission path 2 (time at which the signal is outputted to the transmission system block 53, that is, timing before delaying the transmission path 1) and the reception timings of the signal in the reception path 1' and path 2 (time at which the signal is inputted from the reception system block 52, timing after delaying the reception path 1). When RTT is calculated in this way, and also when radio communication with the mobile terminal 40 is performed via the radio transmitting/receiving equipment 20 connected by the optical fiber 30, it is possible to exclude the delay amount in each sector S and appropriately calculate RTT1 between the radio transmitting/receiving equipment 20 and the mobile terminal 40 in the sector S1 and RTT2 between the radio transmitting/receiving equipment 20 and the mobile terminal 40 in the sector S2 (see FIG. 6).

Furthermore, since the baseband processing section 13 calculates PD by subtracting the maximum delay amount (here, delay amount (2)) reported from the delay correction management section 12 from the Propagation measured value measured by a known technique, it is possible to exclude a delay amount in each sector S and appropriately calculate PD even when performing radio communication with the mobile terminal 40 via the radio transmitting/receiving equipment 20 connected by the optical fiber 30. It is possible to measure an accurate distance from the radio transmitting/receiving equipment 20 to the mobile terminal 40 by using RTT and PD in this way.

The present invention is not limited to the above described embodiments, but can be implemented modified in various ways. For example, the processing section and processing procedure can be modified as appropriate without departing from the scope of the present invention. The other sections can also be implemented as appropriate without departing from the scope of the present invention.

Although a case has been described above where the present invention is implemented as the radio communication system 100 and the radio base station equipment 10, the present invention is not limited to this, but the present invention is also valid as a delay correction method when the radio base station equipment 10 communicates with the radio transmitting/receiving equipment 20 connected by the optical fiber 30. In this case, the present invention is implemented as a delay correction method including a step of measuring for each sector S a delay amount caused between the radio base station equipment 10 and the radio transmitting/receiving equipment 20, a step of setting a reception window of the baseband processing section 13 at a position corresponding to a maximum delay amount of a delay amount measured for each sector S and a step of delaying a signal for each sector S according to a delay correction value obtained by subtracting the delay amount in each sector S from the maximum delay amount. According to this delay correction method, it is possible to set the reception window of the baseband processing section 13 at a position corresponding to a maximum delay amount of the delay amount measured for each sector S and delay the signal according to a delay correction value for each sector S, and thereby receive the signal from each sector without increasing the size of the reception window. Consequently it is possible to perform baseband processing including combining processing on the received signal without increasing cost required for hardware to perform baseband processing even when performing radio communication with the mobile terminal 40 via the radio transmitting/receiving equipment 20 connected by the optical fiber 30.

Furthermore, this delay correction method may also include a step of requesting measurement of an in-device delay amount in the radio transmitting/receiving equipment 20 from the radio base station equipment 10, and a step of calculating a delay amount including an optical fiber delay amount in the optical fiber 30 from the measurement result of the in-device delay amount by the radio transmitting/receiving equipment 20. In this case, the radio transmitting/receiving equipment 20 measures the in-device delay amount and the radio base station equipment 10 calculates a delay amount including the optical fiber delay amount according to the measurement result, and it is thereby possible to accurately calculate the delay amount caused between the radio base station equipment 10 and the radio transmitting/receiving equipment 20 based on the actual measured value of the radio transmitting/receiving equipment 20.

What is claimed is:

1. Radio base station equipment connected to radio transmitting/receiving equipment provided in a sector, into which a communication area is divided, by an optical fiber, and performing radio communication with a mobile station equipment located in each sector via the radio transmitting/receiving equipment, comprising:
    a delay correction section configured to delay a signal for each sector according to a delay correction value obtained by subtracting a delay amount of each sector from a maximum delay amount of a delay amount measured for each sector; and
    a baseband processing section configured to obtain the signal from each sector delayed by the delay correction section by setting a reception window at a position corresponding to the maximum delay amount.

2. The radio base station equipment according to claim 1, further comprising a delay measuring section configured to measure a delay amount caused between the radio base station equipment and the radio transmitting/receiving equipment for each sector.

3. The radio base station equipment according to claim 2, further comprising a delay correction managing section configured to detect the maximum delay amount from the delay amount measured by the delay measuring section and calculate the delay correction value from the maximum delay amount.

4. The radio base station equipment according to claim 2, wherein the delay measuring section is configured to calculate a delay amount including an optical fiber delay amount in the optical fiber from a measurement result of an in-device delay amount in the radio transmitting/receiving equipment.

5. The radio base station equipment according to claim 4, wherein the delay measuring section is configured to calculate a delay amount in each sector from a first time difference between a transmission time of a delay measurement request requesting for a delay measurement for the transmitting/receiving equipment and a reception time of a response to the delay measurement request, a downlink in-device delay amount in a reception system block of the radio transmitting/receiving equipment, an uplink in-device delay amount in a transmission system block of the radio transmitting/receiving equipment, and a second time difference between a reception time of the delay measurement request in the radio transmitting/receiving equipment and a transmission time of a response to the delay measurement request, according to the following equation:

Delay amount=(first time difference−second time difference)/2+(downlink in-device delay amount or uplink in-device delay amount, whichever is greater)

6. A radio communication system comprising:
the radio base station equipment according to claim 4; and
a radio transmitting/receiving equipment having an in-device delay measuring section configured to measure the in-device delay amount in response to a request for a delay measurement from the radio base station equipment.

7. The radio base station equipment according to claim 1, wherein the delay correction section comprises:
a transmission delay correction section configured to delay a transmission signal to the mobile station equipment for each sector; and
a reception delay correction section configured to delay a received signal from the mobile station equipment for each sector.

8. The radio base station equipment according to claim 7, wherein the baseband processing section is configured to regard a time point at which a signal to the mobile station equipment is outputted to the transmission delay correction section as a transmission timing, regard a time point at which a signal from the mobile station equipment is inputted from the reception delay correction section as a reception timing, and calculate RTT (Round Trip Time) in each sector according to the following equation:

RTT=reception timing−transmission timing−(maximum delay amount×2)

9. The radio base station equipment according to claim 7, wherein the baseband processing section is configured to regard a time point at which a signal to the mobile station equipment is outputted to the transmission delay correction section as a transmission timing, regard a time point at which a signal from the mobile station equipment is inputted from the reception delay correction section as a reception timing and calculate PD (Propagation Delay) in each sector according to the following equation:

PD=propagation measured value−maximum delay amount

10. A delay correction method for communicating between a radio transmitting/receiving equipment and a radio base station equipment which is connected to the radio transmitting/receiving equipment provided in a sector, into which a communication area is divided, by an optical fiber and performs radio communication with a mobile station equipment located in each sector via the radio transmitting/receiving equipment, comprising:
measuring a delay amount caused between the radio base station equipment and the radio transmitting/receiving equipment;
setting a reception window of a baseband processing section at a position corresponding to a maximum delay amount of a delay amount measured for each sector; and
delaying a signal for each sector according to the delay correction value obtained by subtracting the delay amount of each sector from the maximum delay amount.

11. The delay correction method according to claim 10, further comprising:
requesting measurement of an in-device delay amount in the radio transmitting/receiving equipment from the radio base station equipment; and
calculating a delay amount including an optical fiber delay amount in the optical fiber from a measurement result of the in-device delay amount by the radio transmitting/receiving equipment.

* * * * *